United States Patent [19]
Ozawa

[11] Patent Number: 5,787,490
[45] Date of Patent: Jul. 28, 1998

[54] MULTIPROCESS EXECUTION SYSTEM THAT DESIGNATES CACHE USE PRIORITY BASED ON PROCESS PRIORITY

[75] Inventor: Toshihiro Ozawa, Kawasaki, Japan

[73] Assignee: Fujitsu Limited, Kanagawa, Japan

[21] Appl. No.: 661,083

[22] Filed: Jun. 10, 1996

[30] Foreign Application Priority Data

Oct. 6, 1995 [JP] Japan ................ 7-259824

[51] Int. Cl.⁶ ........................................... G06F 12/08
[52] U.S. Cl. ........................ 711/173; 711/158; 395/673
[58] Field of Search ..................... 395/673, 674, 395/497.04, 485, 403, 457; 711/173, 158, 3, 130

[56] References Cited

U.S. PATENT DOCUMENTS

| | | | |
|---|---|---|---|
| 4,654,782 | 3/1987 | Bannai et al. | 395/403 |
| 5,109,512 | 4/1992 | Bahr et al. | 395/673 |
| 5,185,861 | 2/1993 | Valencia | 395/200.03 |
| 5,193,172 | 3/1993 | Arai et al. | 395/674 |
| 5,287,508 | 2/1994 | Hejna, Jr. et al. | 395/672 |
| 5,317,738 | 5/1994 | Cochocroft, Jr. et al. | 395/673 |
| 5,446,893 | 8/1995 | Uehara | 395/675 |
| 5,465,342 | 11/1995 | Walsh | 395/446 |

OTHER PUBLICATIONS

Kirk et al., "Allocating SMART Cache for Schedulability", Euromicro Workshop on Real Time, pp. 41–50, Jan. 1991.
Tanenbaum, Andrew S., Modern Operating Systems, Prentice Hall, Upper Saddle River, NJ, pp. 119–128, 1992.
Kirk, David B., "SMART(Strategic Memory Allocation for Real-Time) Cache Desgin", Real-Time Systems, May 1989 Symposium, pp. 229–237.
Stone et al., "Optimal Partitioning of Cache Memory", IEEE Transactions on Computers, V.41, No.9, pp. 1054–1068, Sep. 1992.

Primary Examiner—Tod R. Swann
Assistant Examiner—Christopher S. Chow
Attorney, Agent, or Firm—Armstrong, Westerman, Hattori, McLeland & Naughton

[57] ABSTRACT

A cache use priority of a cache memory is designated by a cache use priority designation unit. In response to an access demand issued from a processing unit, a cache control unit controls the access to the cache memory in accordance with the cache use priority. In the case of a set associative cache for example, the number of ways and the number of blocks to be used within one set are varied based on the cache use priority of a process.

18 Claims, 13 Drawing Sheets

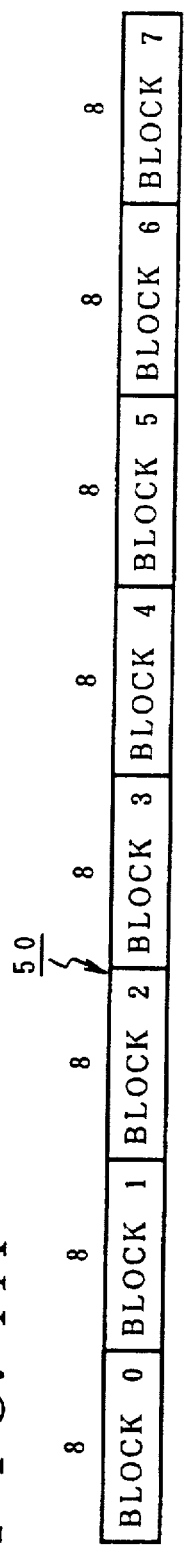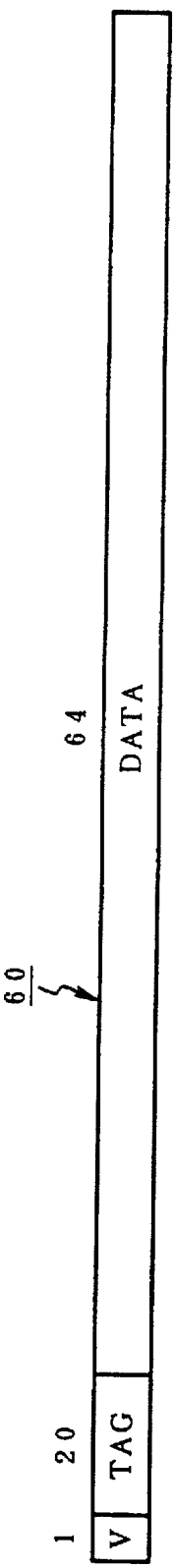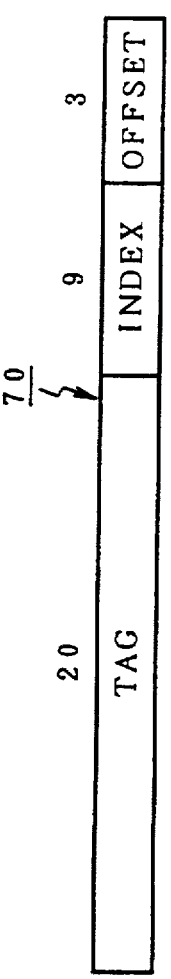

MULTIPROCESS EXECUTION SYSTEM THAT DESIGNATES CACHE USE PRIORITY BASED ON PROCESS PRIORITY

BACKGROUND OF THE INVENTION

1. Field of the Invention

The present invention relates generally to a multiprocessor system for executing a specified process from among a plurality of processes in accordance with a process priority based CPU allocation schedule, and more particularly to a multiprocess execution system having a priority cache which requires priority designation to perform cache control in which main storage resources are temporarily stored for use.

2. Description of the Related Art

In a conventional multiprocessor system for executing a specified process from among a plurality of processes in accordance with a process priority based CPU allocation schedule, the extent of use of the processor resources in executing a process could be designated to some degree by means of, e.g., a priority of the process. With respect to a cache memory, however, due to no use of its priority, even a higher priority process might possibly be prevented from executing its preferential use since it has merely the same right to use the cache memory as the other processes. In an attempt to cause the multiprocess system to solve a certain problem, this would mean that the length of time required for the solution is determined depending on the degree of preferential allocation to that problem. To this end, a wide variety of operating systems are each equipped with a scheduling feature by means of which the process priority can be designated in accordance with the significance of the problem, thereby ensuring a preferential allocation of the processor in proportion to the process priority. It is envisaged however that a nature of the problem to be solved by the process executed by the multiprocess system might possibly allow the length of time required for the solution to depend on the memory capacity available rather than the allocated processor time. For example, data base processing entailing a large volume of data retrieval would spend the greater part of its processing time in moving data from a disk into a memory cache. In such a case, disadvantageously, the highest data retrieval process priority would not make it possible to effectively shorten the process execution time.

SUMMARY OF THE INVENTION

According to an aspect of the present invention, there is provided a multiprocess system capable of executing cache control by designating the priority pertaining to the right to use a cache on process-by-process basis in accordance with the significance of a problem to be solved by a process and with the nature of the memory use.

The multiprocess execution system of the present invention comprises a processing unit (CPU) for executing a specified process from among a plurality of processes in accordance with a process priority based allocation schedule; a cache memory for temporarily storing main storage resources for use in the processing unit; a cache use priority designation unit for designating a cache use priority P pertaining to the cache memory when any one process is executed by the processing unit; and a cache control unit for controlling, in response to an access demand from the processing unit, an access to the cache memory in accordance with the cache use priority P. Preferably, the cache use priority designation unit designates a cache use priority identical to the process priority. Alternatively, the cache use priority designation unit may designate a cache memory priority different from the process priority. In this case, the cache use priority designation unit designates a cache use priority P on the basis of the nature of main storage use by a process to be executed. More specifically, when a process to be executed is a retrieval, the cache use priority designation unit designates a higher cache use priority than those of simultaneously scheduled other processes. The cache use priority designation unit might designate the cache use priority on the basis of statistical information on hit and mishit logged in the cache control unit. For example, when there occur frequent mishits in the cache control unit, the cache use priority designation unit designates a higher cache use priority than those of simultaneously scheduled other processes, but when there occur rare mishits therein, it designates a lower cache use priority than those of simultaneously scheduled other processes. The cache control unit varies the behavior of cache control unit in accordance with the cache use priority P. For example, the cache control unit is provided with a set associative control feature. The set associative cache control employs a cache arrangement in which the cache memory is divided into set regions each consisting of frame blocks of a predetermined number of ways m, each frame block having a length corresponding to a predetermined block length of the main storage. For example, the cache arrangement is called a two-way associative cache with m=2, and a four-way associative cache with m=4. The frame blocks constituting each set in the set associative cache arrangement each includes a valid bit field, a tag field having a process ID, and a data field for storing one frame block of the main storage therein. When the processing unit issues an access demand, an index-based designation of a set region performed in response to an access demand from the processing unit allows one or a plurality of frame blocks within the set region to be acquired. If there exists a frame block whose tag field process ID coincides with a process ID included in the access demand and whose valid bit is set, judgment results in a hit to handle the access demand. Unless these requirements are satisfied, then the judgment results in a mishit.

The cache control unit employing the set associative cache varies, in accordance with a cache use priority P designated, the number of ways m of the set associative control available to a process. For example, the cache control unit calculates, at the time of a process changeover, a modified number of ways n by multiplying the number of ways m of the set associative control by a ratio $(P/P_{max})$ of a designated cache use priority P to a designation possible maximum cache use priority $P_{max}$, and executes upon the subsequent reception of an access demand from the processing unit, set associative cache control in accordance with the modified number of ways n. In the case where the cache control unit judges a mishit with respect to, e.g., a read demand from the processing, it carries out the following processing for the replacement of the main storage data.

I. First, the cache control unit acquires from the cache memory a frame block whose tag includes the same process ID as that of the demand access, to count the number of the frame blocks M. This finds the number of frame blocks being used by this process within one set in the set associative cache arrangement.

II. If the count value M is less than the modified number of ways n (M<n), the cache control unit determines an object frame block from among all the frame blocks which have not been used by a process within a set, to replace its main storage data.

III. If the count value M is equal to or greater than the modified number of ways n (M≧n) and there exists a frame block whose valid bit has not been set, the frame block being in invalid state in the set is determined as an object to replace its main storage data.

IV. If the count value M is equal to or greater than the modified number of ways n (M≧n) and all the valid bits have been set, an object frame block is determined from among the frame blocks being used by the process in the set, to replace its main storage data. In this case, the number of frame blocks available in one set will be limited in accordance with the cache use priority. Incidentally, the main storage data replacement is carried out by means of e.g., LRU algorithm.

It is also understood that the cache control unit may directly vary, in accordance with a cache use priority P which has been designated, the index number for defining the upper limit of the number of use blocks of each set region in the set associative control available to a process. More specifically, the cache control unit calculates, at a process changeover, a modified index number $I_n$ obtained by multiplying the maximum value $I_m$ of the index number determined by the number of frame blocks constituting each set region by a ratio $(P/P_{max})$ of the cache use priority P to a designation possible maximum cache use priority $P_{max}$. Afterwards, the cache control unit executes, upon the reception of an access demand from the processing unit, set associative cache control inside a frame block region of each set region restricted by the modified index number $I_n$. In other words, the cache control unit executes, upon the reception of an access demand from the processing unit, the set accociative control by using as the modified index number the integral part $I_0$ of the value obtained by multiplying a demanded index I by a ratio $(I_n/I_m)$ of the modified index number $I_n$ to the maximum value $I_m$. Moreover, the cache control unit designates a cache use priority P at the time of a process changeover, and upon the reception of an access demand from the processing unit combines as a high-order address the value based on the cache use priority P designated at the process changeover with an index I of the access demand, and executes the set associative control for a specified set region defined by the high-order address.

In the present invention in this manner, the priority pertaining to the right to use a cache for instance is given the same priority as the process priority. It would be easy to designate this cache use priority since it depends on the process priority which corresponds to the significance of a problem solving. The cache use priority could also be designated differently from the process priority. This cache use priority designation would ensure a more proper cache control in accordance with the nature of the memory use by a process. Furthermore, the priority pertaining to the right to use a cache could be dynamically varied so as to be able to obtain the cache use priority in conformity with the process priority. For example, if cache mishits occur very frequently during the executing of a higher priority process, the priority pertaining to the right to use the cache will be dynamically raised. Inversely, if a lower priority process hardly gives rise to the cache mishits, the cache use priority will be dynamically lowered. The priority is varied while acquiring such statistical data during the execution, This would make it possible to designate the cache use priority on a process-by-process basis and to modify the cache use priority used and to vary the manner of using the cache in accordance with this process priority, thus ensuring more rapid processing.

The above and other objects, features and advantages of the present invention will become more apparent from the following detailed description when taken in conjunction with the accompanying exemplary drawings.

BRIEF DESCRIPTION OF THE DRAWINGS

FIGS. 4A to 4C are explanatory diagrams illustrating formats respectively of a main storage frame block, cache frame block, and an access address of FIG. 2;

DETAILED DESCRIPTION OF THE PREFERRED EMBODIMENTS

Figure 1:
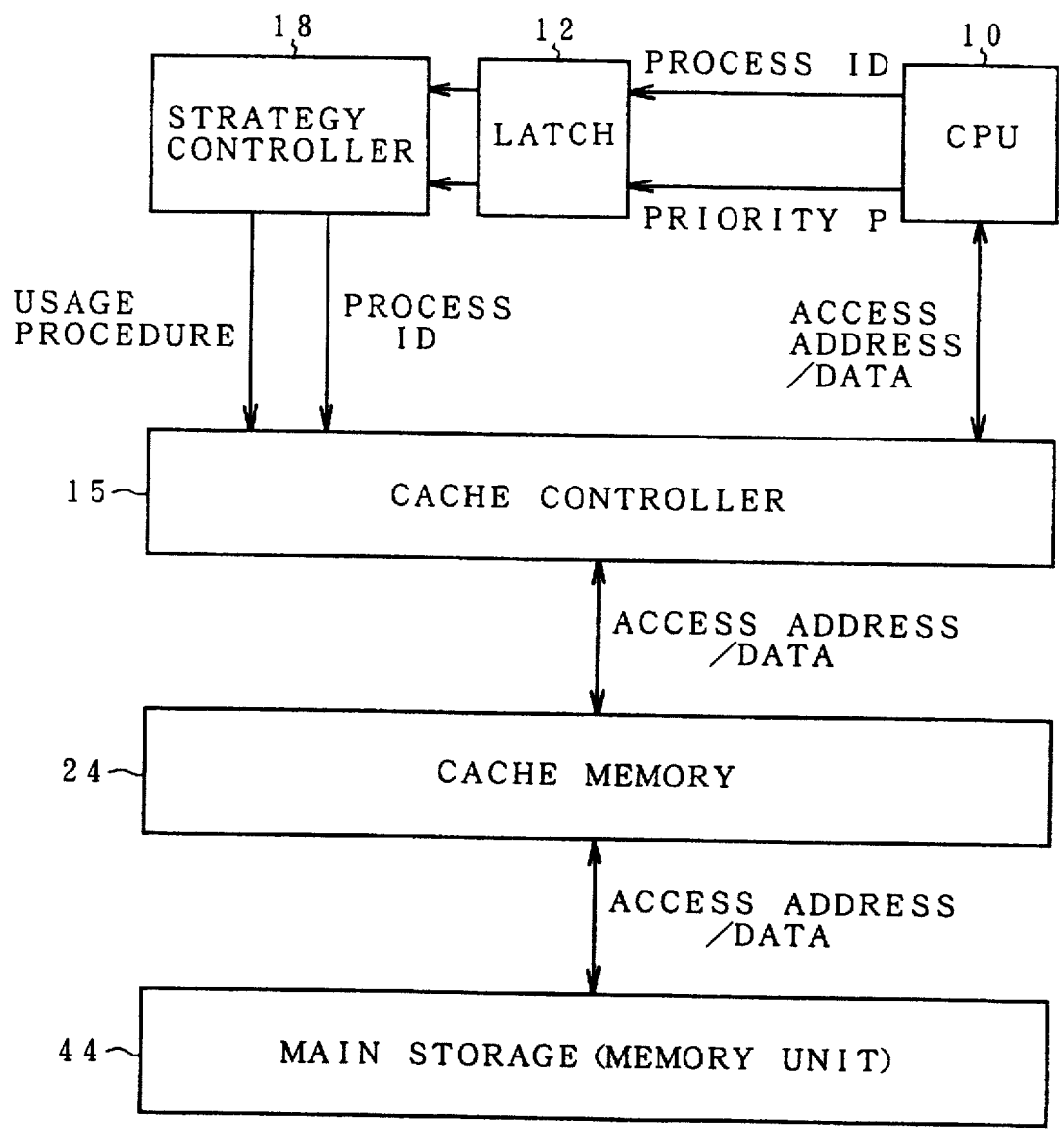
FIG. 1 is a block diagram illustrating an operative environment of the present invention.

Referring first to FIG. 1, there is shown a block diagram illustrating an operative environment of a multiprocess execution system intended to carry out a priority cache control according to the present invention. Prior to the execution of each process, a CPU 10 serving as a processing unit performs for a plurality of processes a scheduling for allocating use time of the CPU 10 to individual processes in accordance with priorities assigned to the respective processes. The plurality of processes to be executed in accordance with the scheduling on allocation time of the CPU 10 in this manner are each provided with a process ID indicating each process. The process ID includes a process priority which is designated to determine the length of the use time of the CPU 10 in response to the significance of problem-solving to be executed by that process. Associated with the CPU 10 is a cache controller 15 for controlling a cache memory 24 acting as a cache. If a primary cache lies within the CPU 10 the cache memory 24 will act as the secondary cache.

Associated with the cache memory 24 is a main storage 44 functioning as an external memory unit. In the thus configured multiprocess execution system of the present invention, the plurality of processes to be executed by the CPU 10 are assigned respective priorities pertaining to the use of the cache memory 24, that is, cache use priorities P. A feature for assigning the cache use priorities to the processes to control the cache controller 15 can be comprised of a latch 12 which serves to hold a process ID and a cache use priorities P from the CPU 10, and a strategy controller 18 which gives rise to a change in the cache control strategy of the cache controller 15 on the basis of the cache use priority P held in the latch 12. At the time of a process changeover, the CPU 10 saves therein from a register of the latch 12 the process ID and cache use priority P of the process which has been hitherto executed, and then writes to the register of the latch 12 a process ID and cache use priority P of a process to be next executed. Based on the process ID and cache use priority P newly written to the register of the latch 12, the strategy controller 18 determines a strategy of cache replacement for the cache memory 24 of data from the main storage 44 and controls the cache controller 15 on the basis of the thus determined strategy.

The cache use priority to be written by the CPU 10 to the register of the latch 12 at a process changeover could be obtained by:

I. Designation of the same cache use priority P as the process priority; or

II. Designation of a different cache use priority P from the process priority.

In the case of designating a cache use priority P different from the process priority, a cache use priority may be provided in the form of control information to the CPU in accordance with the significance of a problem which the process attempts to solve and with the nature of memory use. In the case of using a cache use priority P different from the process priority and modifying dynamically the cache use priority, statistical information indicating a cache hit and mishit history may be logged in the cache controller 15 on a process-by-process basis so that the strategy controller 18 can make inquiries about information on a cache control hit or mishit judgment. If there appear frequent mishits, the cache use priority may be so modified as to be above the cache use priorities assigned to the other processes. When a cache use priority of a process is dynamically modified, the strategy controller 18 receives the most recent cache use priority through the latch 12 from the CPU 10 while simultaneously receiving the number of times of cache mishits from the cache controller 15. The strategy controller 18 then calculates the cache use priority of the process and writes it to the register of the latch 12. In this case, upon a changeover to the next process, the CPU 10 saves therein the cache use priority of the process which has been hitherto executed and then writes a cache use priority of the next process to the register of the latch 12. It is to be appreciated that if the cache use priority is not dynamically modified, there is no need for saving of the cache use priority from the register of the latch 12. Cache strategies to be set in the cache controller 15 by means of the strategy controller 18 could include for instance a set use priority in a set associative cache serving as the cache controller 15, a pseudo cache capacity variation, or a change in cache use area.

Figure 2:
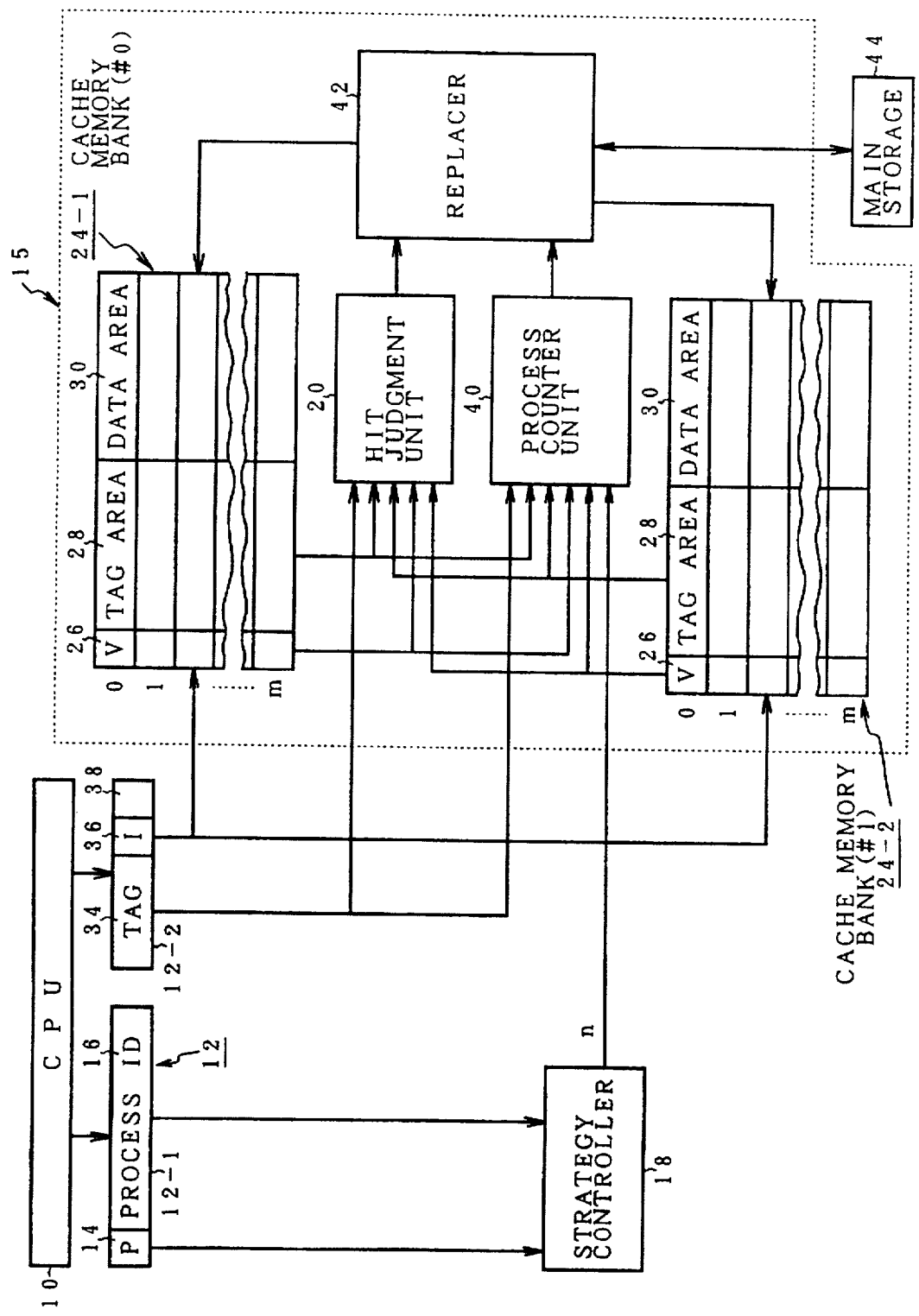
FIG. 2 is a function block diagram of an embodiment according to the present invention, employing a two-way set associative cache control.

Referring to FIG. 2, there is shown a function block of an embodiment according to the present invention in the case of using a set associative cache as the cache controller 15. The latch 12 associated with the CPU 10 comprises registers 12-1 and 12-2. Upon the process changeover by the CPU 10, a cache use priority 14 and a process ID 16 are written to the register 121. An access address is written to the register 12-2 when there has occurred an access demand, that is, a read access or a write access with respect to the main storage 44 during the process execution. The access demand includes a tag 34, an index 36 and an offset 38. The cache controller 15 in the form of a two-way accociative cache by way of example comprises cache memory banks 24-1 and 24-2 indicated respectively at bank #0 and bank #1 which are obtained by dividing the cache memory 24 (into two in this case) in response to the number of ways m=2, a hit judgment unit 20, a process counter unit 40 and a replacer 42 for performing a main storage 44 data cache replacement.

Figure 3:
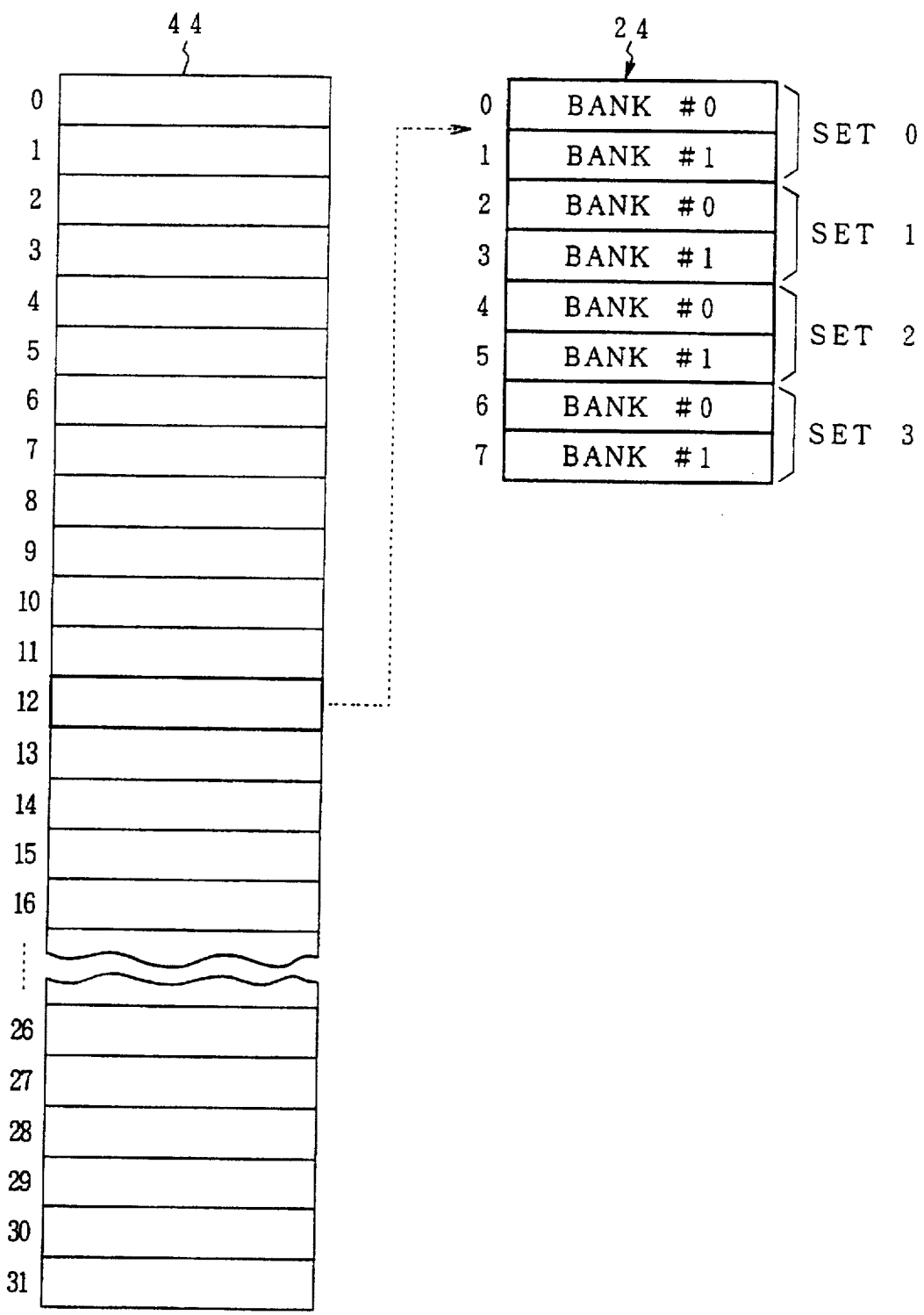
FIG. 3 is an explanatory diagram of the two-way set associative cache control.

The set associative cache is described hereinbelow with reference to FIG. 3. Assume now that the main storage 44 is divided into 32 blocks, the cache memory 24 having a capacity of eight blocks equivalent to a quarter thereof. With brief reference to FIG. 4A, one block of the main storage 44 consists for instance of eight blocks 0 to 7, each block including eight bits, which will be referred to as a main storage frame block 50. With brief reference to FIG. 4B, one block of the cache memory 24 which will be referred to as a cache frame block 60 consists of a data field for storing therein 64-bit data of the main frame block 50, a tag filed (20 bits) for storing therein tag information, and a valid bit field for storing therein a valid bit V. The tag field usually includes a process ID. Referring back to FIG. 3, if any block of the main storage 44 is arranged in a set at a limited position within the cache memory 24, this will be called a set accociative cache. One set of the cache memory 24 is a group consisting of one or a plurality of cache frame blocks 60. In the cache memory of FIG. 3, one set is comprised of two cache frame blocks 60 by way of example. Since the cache memory includes a total of eight blocks, it has four sets 0, 1, 2 and 3 which are segmented by two blocks. One frame block included in the main storage 44 is first mapped into a specified set in the cache memory 24 and then is arranged at an arbitrary position within the set. The set in the cache memory 24 where a main frame block is to be located is ordinarily designated by a bit select, which will be determined by (block frame address) Modulo (the number of sets in a cache)

Figure 5A:
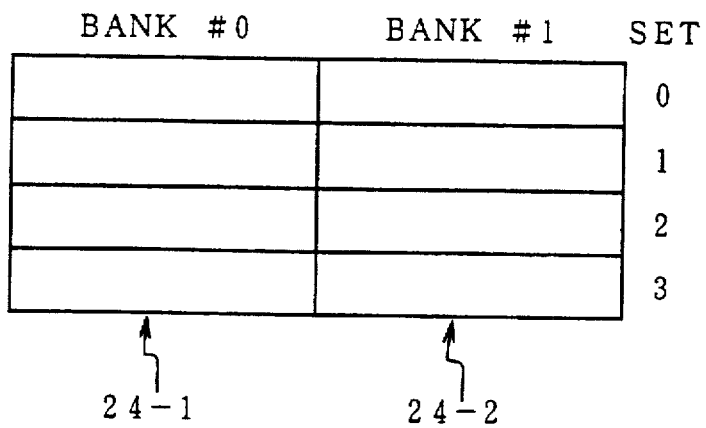
FIGS. 5A and 5B are explanatory diagrams each illustrating a two-way set associative memory bank configuration.
Figure 5B:
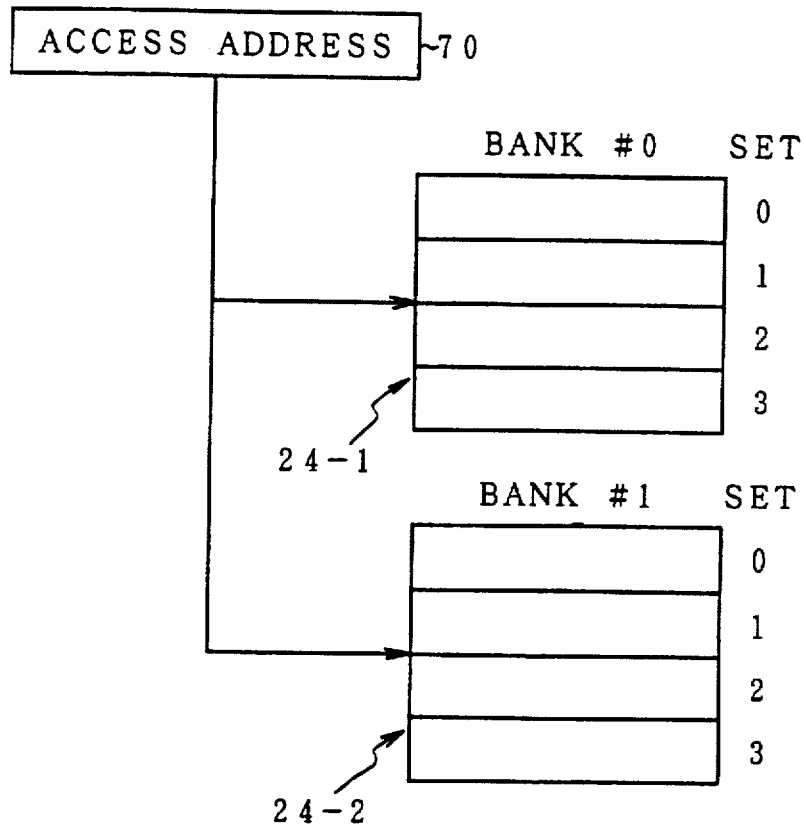

This means that the set in the cache memory 24 is represented by the remainder obtained when dividing by the number of sets the block frame address of the main storage 44 to be replaced into the cache memory 24. Providing that the cache memory 24 includes four sets, each set consisting of two blocks, a block 12 of the main storage 44 is to be located at a set 0 of the cache memory 24 since 12/4=3 with remainder 0. The number of blocks m constituting one set in the cache memory 24 is referred to as the number of ways and hence if one set includes m blocks, an m-way associative cache will be provided. The cache memory arrangement of FIG. 3 will therefore be called a two-way associative cache since the number of ways m=2. The cache memory 24 with the two-way associative cache arrangement shown in FIG. 3 has a two-bank memory configuration as shown in FIG. 5A in which odd-numbered blocks and even-numbered blocks of the sets 0 to 3 are indicated respectively at the banks #0 and #1 and in which two frame block banks are managed at the same set. More specifically, as shown in FIG. 5B, an access address 70 is used to perform in parallel the same addressing with respect to the cache memory banks 24-1 and 24-2 which are indicated at the banks #0 and #1, respectively. With brief reference to FIG. 4C, the contents of the access address 70 includes a 20-bit tag, 9-bit index, and 3-bit offset. A cache memory replacement of data from the main storage 44 occurs when a read access by the CPU 10 results in a mishit. The access address 70 of this read access allows its index to be used to designate the same entry of the cache memory banks 24-1 and 24-2. The tag of the cache frame blocks having the thus designated entry are read out in parallel and are compared with the tag of the access address 70. If two tags coincide with each other and the valid bit V of the cache frame block is set, the read-accessed data prove to be present, resulting in a cache hit judgment to allow the data within the cache frame block 60 of FIG. 4B to be returned to the CPU 10. On the contrary, if the tag of a cache frame block read out through the designation of an entry by means of the index of the access address 70 does not coincide with the tag of the access address 70, or if in spite of coincidence, the valid bit V is not set, it would result in a mishit to allow a cache memory 24 replacement of data from the main storage 44. Although a typical replacement is carried out in accordance with the number of ways m, the present invention allows the number of ways of one set, that is, the number of frame blocks constituting one set used for the replacement attendant on a mishit at the time of read access to be changed in conformity with the value of the cache use priority P. On the assumption that such a set associative cache arrangement is employed, description will now be given of control to be performed by the cache controller 15 of FIG. 2 based on a cache strategy from the strategy controller 18.

In the cache controller 15 of FIG. 2, the number of frame blocks, that is, the number of entries used for a set of the cache memory employing the set associative cache is varied on a process-by-process basis in response to a cache use priority designated by the CPU 10 at the time of a process changeover. Although the cache controller 15 itself employs for instance a two-way set associative cache arrangement, a lower priority process is controlled by the strategy controller 18 in such a manner that the number of frame blocks (the number of entries) to be used in one set is limited to one-way. Through such a control of the number of ways of the set associative cache by the strategy controller 18 in response to the cache use priority, the replacement upon a read access cache mishit would be performed by a normal set associative cache action if the number of the frame blocks belonging to the same process included in the object to be replaced in the set is less than the number of modified number of ways designated in accordance with the cache use priority. On the contrary, if the number of the frame blocks belonging to the same process is greater than the modified number of ways, then only the frame blocks belonging to the same process will be subjected to a replacement by means of, e.g., an LRU (least recently used) algorithm. This will be described hereinbelow in more detail. Turning back to FIG. 2, when a process to be executed by the CPU 10 is changed over, the CPU 10 writes to the register 12-1 of the latch 12 a process ID and a cache use priority of a process to be next executed. On the basis of the cache use priority P written to the register 12-1 of the latch 12, the strategy controller 18 calculates the modified number of ways n used for the process from the cache use priority P with respect to the original number of ways m which has been initially set therein. This modified number of ways n is given as:

$$n = m \times (P/P_{max}) \quad (1)$$

where m is the original number of ways of a set associative cache, $P_{max}$ is the maximum value of a cache memory use priority, and P is a cache use priority of a process. Use is made of the integral part of the result derived from this expression (1).

Assume that the CPU 10 issues a data read demand after the strategy controller 18 has set the modified number of ways n obtained from the expression (1) in the process counter unit 40 of the cache controller 15. In response to this read demand by the CPU 10, the tag 34, index 36 and offset 38 are written to the register 12-2 of the latch 12. In conformity with the designation of entry of the cache memory banks 24-1 and 24-2 by the index 36 written to the register 12-2, the cache controller 15 fetches a cache frame block corresponding thereto and sends its valid bit 26 and tag area 28 to the hit judgment unit 20. The hit judgment unit 20 compares the tag 34 written to the register 12-2 of the latch 12 with the tag area 28 of the cache frame block, and checks whether the valid bit 26 is set or reset. If the two tags are coincident with each other and the valid bit 26 is set, the judgment will result in a cache hit, allowing the value of that data area 30 to be returned to the CPU 10. On the contrary, if the two tags are not coincident with each other or even though they are coincident with each other, if the valid bit 26 is reset showing an invalid frame block state, judgement will result in a cache mishit, instructing the replacer 42 to perform a replacement action by reading in the data from the main storage 44.

The replacement action performed by the replacer 42 takes advantage of the results of count by the process counter unit 40. At the timing when the tag area 28 and valid bit 26 are sent from the cache memory banks 24-1 and 24-2 to the hit judgment unit 20, the process counter unit 40 receives the process ID within the tag area 34 written to the register 12-2 of the latch 12 and the process ID within the cache frame block tag area 28. The process counter unit 40 compares two process ID's with each other to count the number of coincidence of the process ID's, and forwards to the replacer 42 the result as well as the valid bit information of the cache frame block whose process ID has coincided with the process ID of the tag area 34. Let M be a count value in the process counter unit 40. The replacer 42 places the value read out from the main storage 44 into the cache memory 24 in accordance with the following replacement criteria.

I. When the count value M is less than the modified number of ways n (M<n), the object bank is determined from among all the banks within the set to thereby replace its main storage data.

The replacement employs the LRU algorithm.

II. When the count value M is equal to or greater than the modified number of ways n (M≧n) and there exists a bank whose valid bit has not been set in the set, that bank being in invalid state is regarded as the object, to thereby replace its main storage data. The replacement employs the LRU algorithm.

III. When the count value M is equal to or greater than the modified number of ways n (M≧n) and all the valid bits in the set have been set, the object bank is determined from among the banks which are being used by that process, to thereby replace its main storage data. The replacement employs the LRU algorithm.

It is to be noted in the above replacement conditions I to III that frames within one set of the associative cache correspond to cache frame blocks having the same entry 0 in the FIG. 2 cache memory banks 24-1 and 24-2. Hence, the number of banks within one set coincides with the number of frame blocks within one set. The execution of the cache memory replacement of the main storage 44 data in accordance with the above replacement requirements I to III would ensure an effective cache use by the ordinary replacement as long as within the set there exists a bank whose valid bit remains reset as seen in the replacement requirement II. In the case where all the banks receive data allowing the valid bit to be set, the number of the banks used for the replacement will be limited to within the range of the modified number of ways n determined by the strategy controller 18, which results in a reduced cache hit ratio as compared with the case of the number of ways having no limitation.

Figure 6:
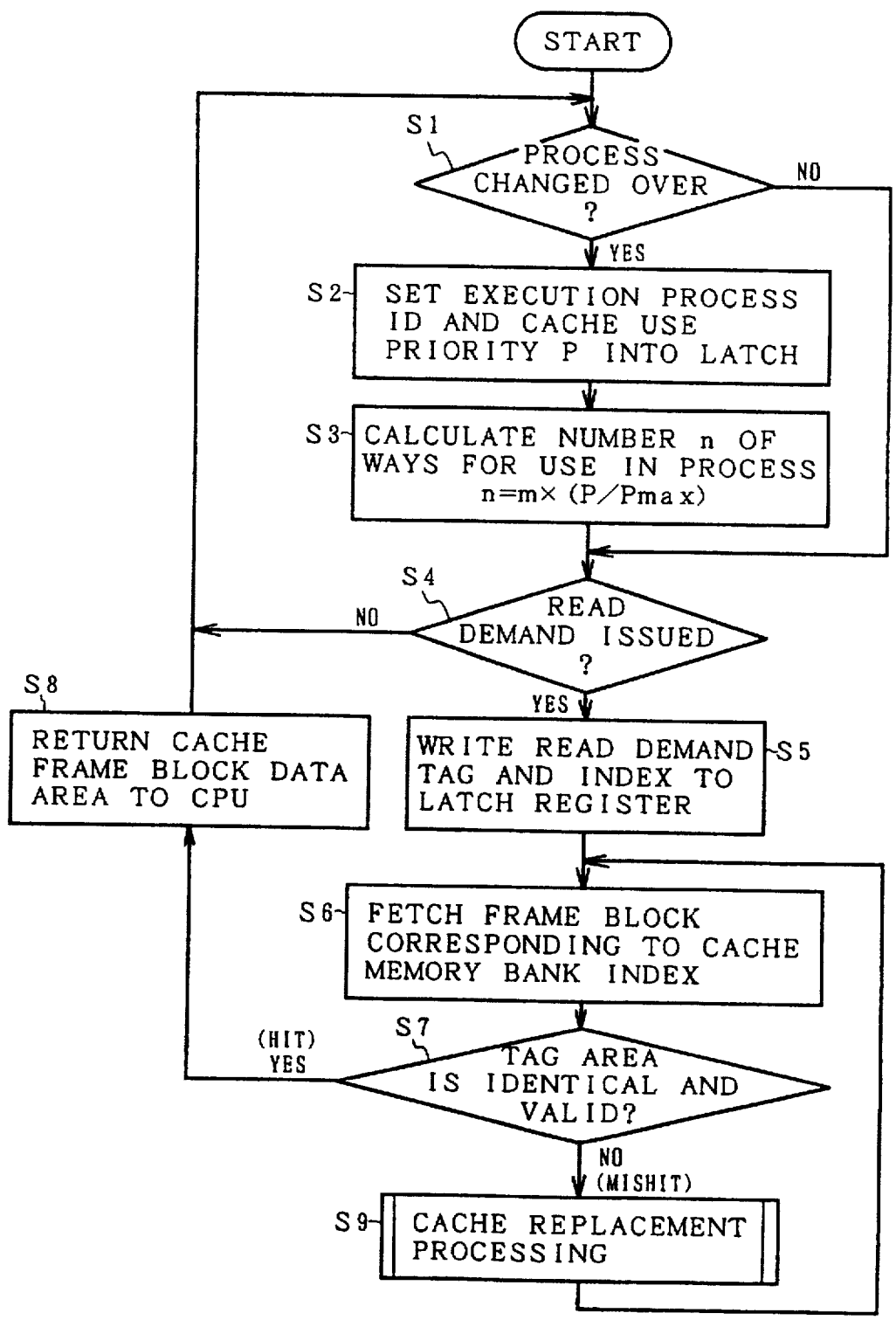
FIG. 6 is a flow chart showing the control processing based on the designation of a cache use priority of FIG. 2.

Referring to FIG. 6, there is shown a flow chart of control processing performed when modifying in response to the cache use priority the number of ways to be used within a set of the set associative cache according to the embodiment of FIG. 2. In step S1, the system waits for a process changeover by the CPU and if the process has been changed over, control advances to step S2 in which a process ID and a cache use priority P of a process to be next executed are set into a register of the latch 12. In response to this latch 12 register set, the strategy controller 18 calculates the modified number of ways n to be used in the process from the expression (1) and sets the result into the cache controller 15 (step S3). Then, in step S4, it is checked whether a read demand has been issued or not. If affirmative, control advances to step S5 in which an access address including a tag, an index and an offset indicating the position of a data area is written to the register 12-1 of the latch 12. Subsequently, the cache controller 15 fetches a cache frame block corresponding to each cache memory bank index (step S6) and sends its tag area and valid bit to the hit judgment unit 20 to check whether or not there exists a cache frame block with a tag area identical to the access address set tag area and with a valid bit being set (step S7). If there is a cache frame block which fits the requirements of the step S7, the judgment results in a cache hit allowing control to advance to step S8 in which the cache frame block data area is returned to the CPU 10. On the contrary, if there is no cache frame block which fits the requirements of the step S7, control advances to step S9 for cache replacement processing.

Figure 7:
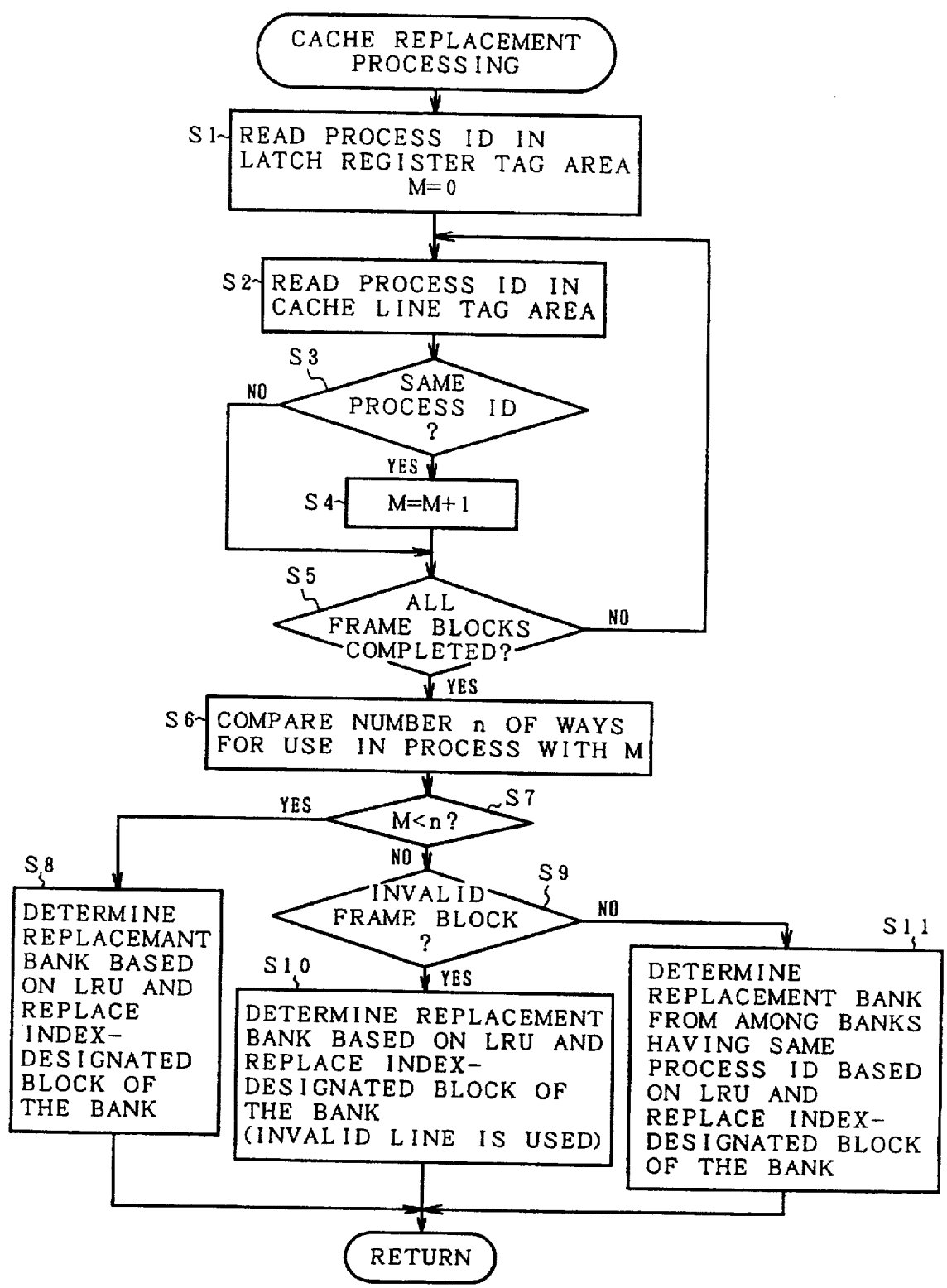
FIG. 7 is a flow chart showing the cache replacement processing of FIG. 6.

Referring to FIG. 7, there is shown the cache replacement processing in detail. First, a process ID within the tag area of the access address written to the register 12-1 of the latch 12 is read in step S1, and a process ID within the tag area acquired from the cache frame block is read in step S2, and then a comparison is made in step S3 on whether or not the two process ID's are coincident with each other. If they are coincident with each other, the count value M is incremented by one in the process counter unit 40 (step S4). In step S5 the above processing is repeated until the processing for all the cache frame blocks is completed. In subsequent step S6 a comparison is made between the modified number of ways n used by the process and the count value M defined in step S4. If the count value M is less than the modified number of ways n, then control advances to step S8 in which a bank to be replaced is determined in accordance with LRU algorithm and then the index-designated block of the bank is replaced with the main storage data. If the count value M is not less than the modified number of ways n, then it is checked in step S9 whether there exists a bank whose valid bit is reset resulting in an invalid frame block in the set. If exists, a replacement bank is determined in step S10 from among invalid banks on the basis of LRU algorithm and the index-designated block of the bank is replaced with the main storage data. This means that use is made of cache frame blocks being in invalid state. If all the valid bits are set in step S9, control advances to steps S11 in which a replacement bank is determined from among banks having the same process ID based on LRU algorithm and the index-designated block is replaced with the main storage data.

Figure 8:
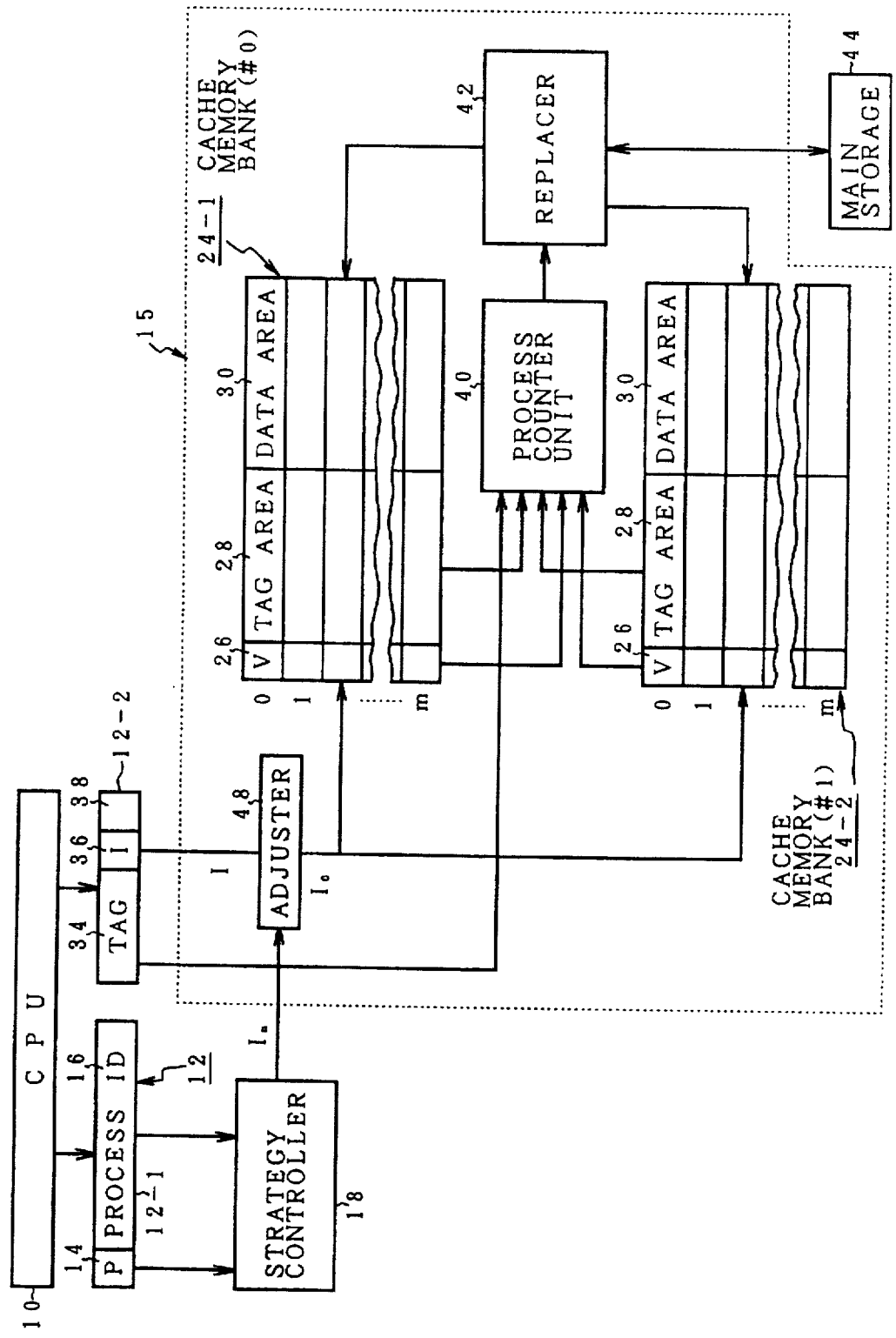
FIG. 8 is a function block diagram of an embodiment according to the present invention, intended to limit the set region by use of the cache use priority.

Referring to FIG. 8, there is shown another embodiment of the present invention intended to modify the method of a set accociative cache in response to the cache use priority. This embodiment is characterized in that the cache capacity is varied in a pseudo manner in accordance with the cache use priority of a process. Once the process executed by the CPU 10 is changed over, the CPU 10 writes to the register 12-1 of the latch 12 the process ID and cache use priority of a process to be next executed. The strategy controller 18 calculates an index number In available to the process on the basis of the cache use priority. This process use index number $I_n$ can be given as an integral part of the result derived from:

$$I_n = I_m \times (P/P_{max}) \quad (2)$$

where $I_m$ is an index number, that is, the number of indexes per bank originally included in a set associative cache. $P_{max}$ is the maximum value of the cache use priority, and P is a cache use priority of a process. The process use index number $I_n$ calculated by the strategy controller 18 is set in an adjuster 48 located in the cache controller 15. When the CPU 10 issues a data read demand after a process changeover, the tag 34, index 36 and offset 38 of the access address are written to the register 12-2 of the latch 12.

By use of the process use index number $I_n$ delivered from the strategy controller 18 and on the basis of the value I of the index 36 designated as the access address, the adjuster 48 calculates the modified index number $I_0$ from the following expression:

$$I_0 = I \times (I_n/I_m) \quad (3)$$

where used as the modified index number $I_0$ is only the integral part of the result. Due to the modified index number $I_0$, based on the cache use priority P, a lower cache use priority process will have a smaller modified index number $I_0$, making it impossible for the process to use indexes belonging to a large-numbered index region or entry region within the cache memory banks 24-1 and 24-2.

Figure 9:
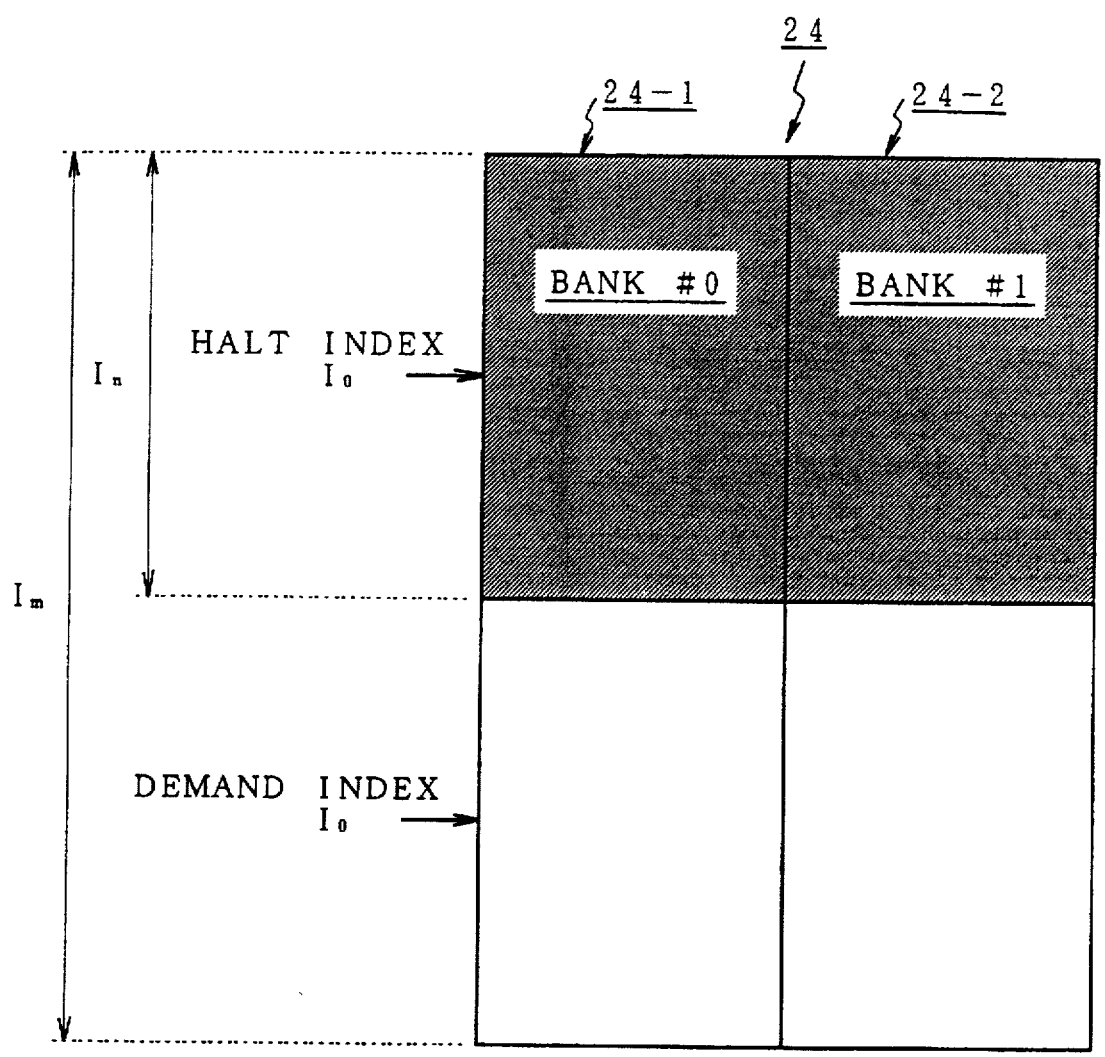
FIG. 9 is an explanatory diagram of the set region limitation according to the embodiment of FIG. 8.

FIG. 9 illustrates in particular the two-way associative cache of FIG. 8, in which the original numbers of indexes, that is, original index number is represented as $I_m$. Assuming now that the cache use priority P=1 has been designated for a process, the index number $I_n$ available to the process results in $I_n = 0.5 \times I_m$ from the expression (2) since the cache use priority maximum value $P_{max}=2$. In other words, the cache use is limited to the index number $I_n$ which is indicated by a hatched region in FIG. 9 and corresponds to a half of the original index number $I_m$. Providing that in this situation, a read demand designates a demand index I lying on a region between the index numbers $I_n$, and $I_m$ as shown in FIG. 9, the modified index number $I_0 = 0.5 \times I$ is derived from the expression (3), to allow cache control to be carried out so as to designate a corresponding index within the index number $I_n$ which is the integral part of the result. It is to be appreciated that the cache control itself based on the limitation, by the strategy controller 18, of the process use index number $I_n$ in accordance with the process use priority is substantially the same as the case of the set associative cache of FIG. 2. According to the FIG. 8 embodiment, a higher process cache use priority will lead to a wider index range of each bank available to a process, enabling a larger cache region to be used. Inversely, a lower process cache use priority will result in a narrower index range of each bank available, allowing a smaller cache region to be used.

Figure 10:
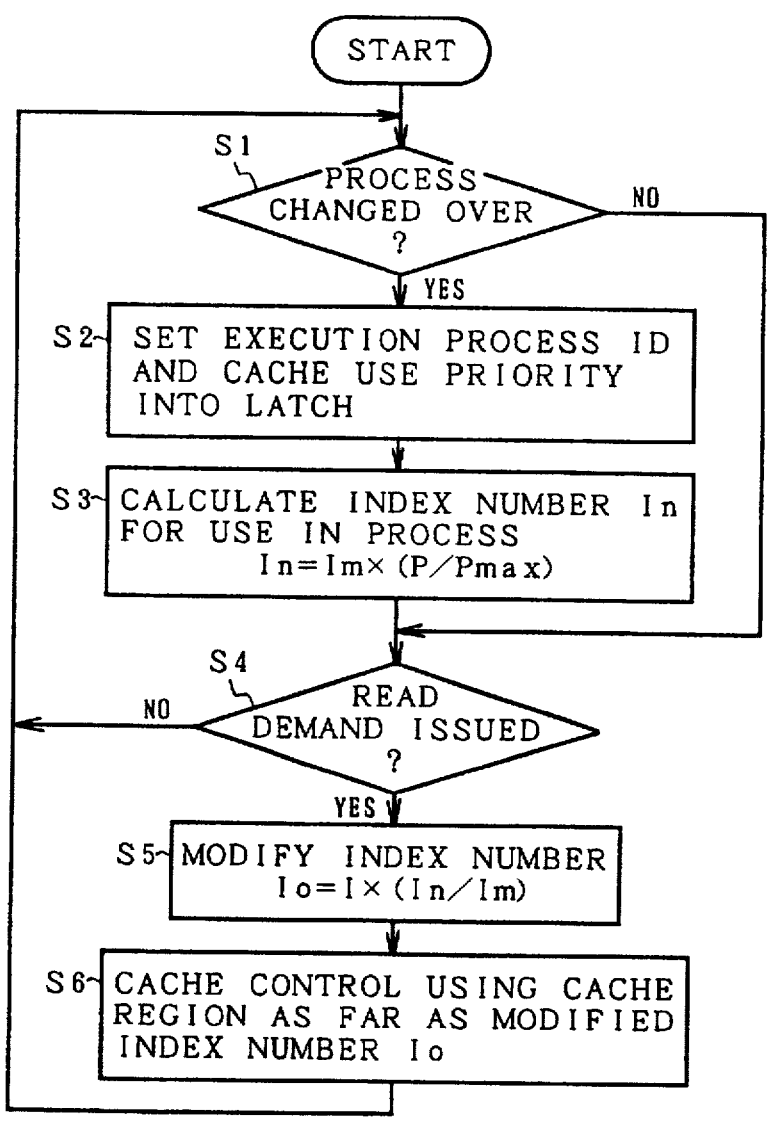
FIG. 10 is a flow chart showing the control processing of FIG. 9.

Referring to FIG. 10, there is shown a flow chart of the control processing of FIG. 8. If in step S1 a process changeover is carried out by the CPU 10, in step S2 the process ID and cache use priority of a process to be next executed are written to the register 12-1 of the latch 12. Then, in step S3 the strategy controller 18 calculates the index number $I_n$ available to the process in accordance with the expression (2). When such a process changeover procedure is over, it is checked in step S4 whether the processor 10 has issued a read demand or not. Upon the reception of a read demand, control advances to step S5 in which by use of the process use number of index $I_n$ imparted from the strategy controller 18, the adjuster 48 calculates the modified index number $I_0$ from the expression (3) with the current demand index I, and then to step S6 in which set associative cache control is carried out using on a bank-by-bank basis the entries up to the modified index number $I_0$ thus calculated.

Figure 11:
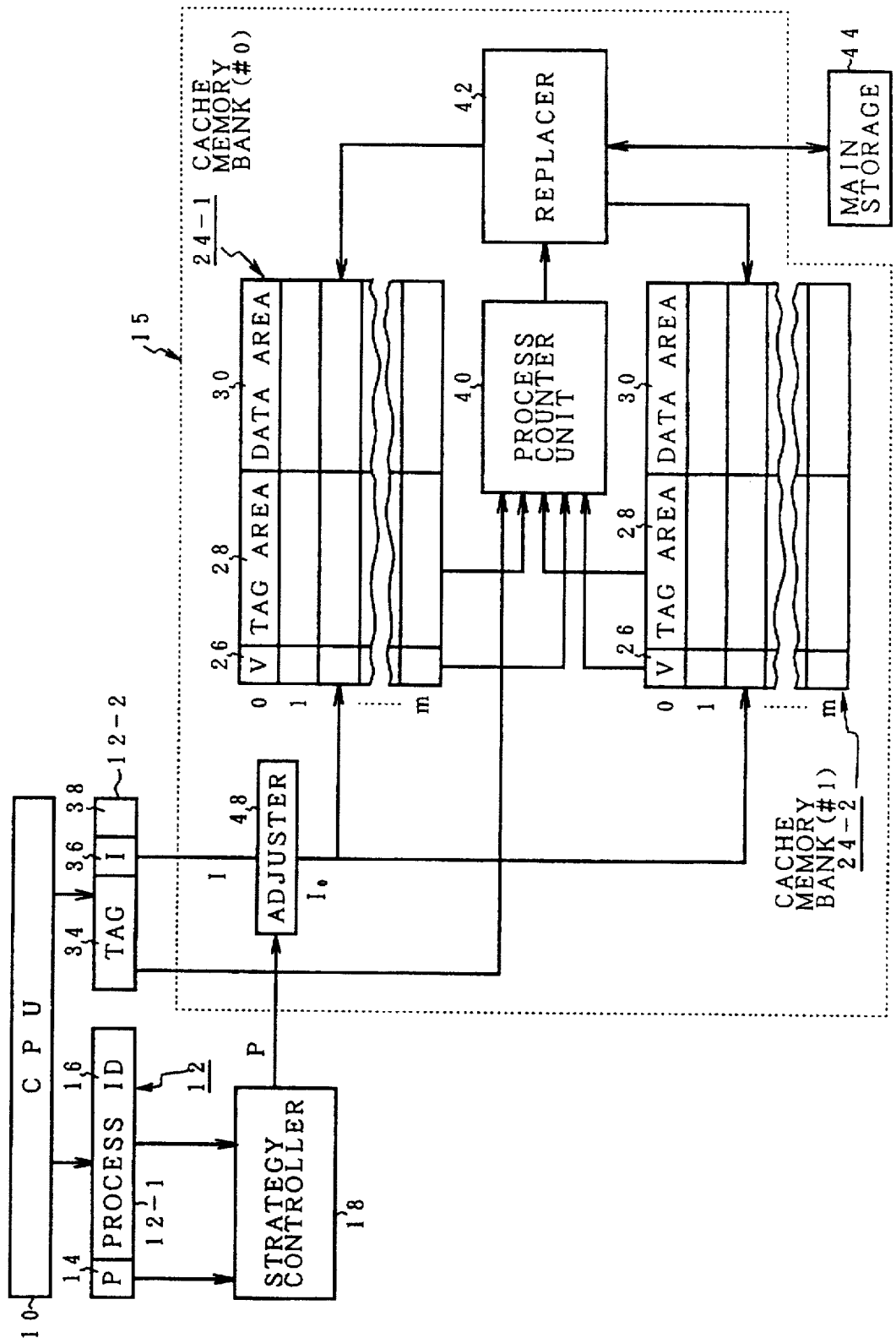
FIG. 11 is a function block diagram of an embodiment according to the present invention, intended to allocate specified set regions by use of the cache use priority.
Figure 12:
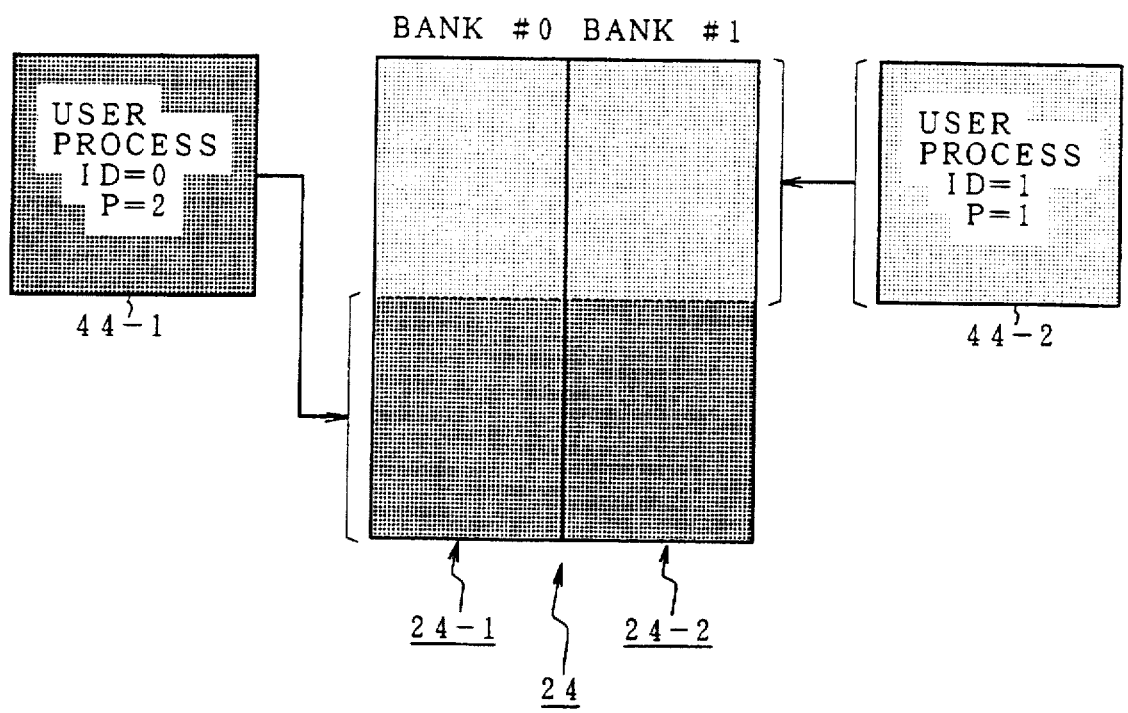
FIG. 12 is an explanatory diagram of the set region allocation of FIG. 11.
Figure 13:
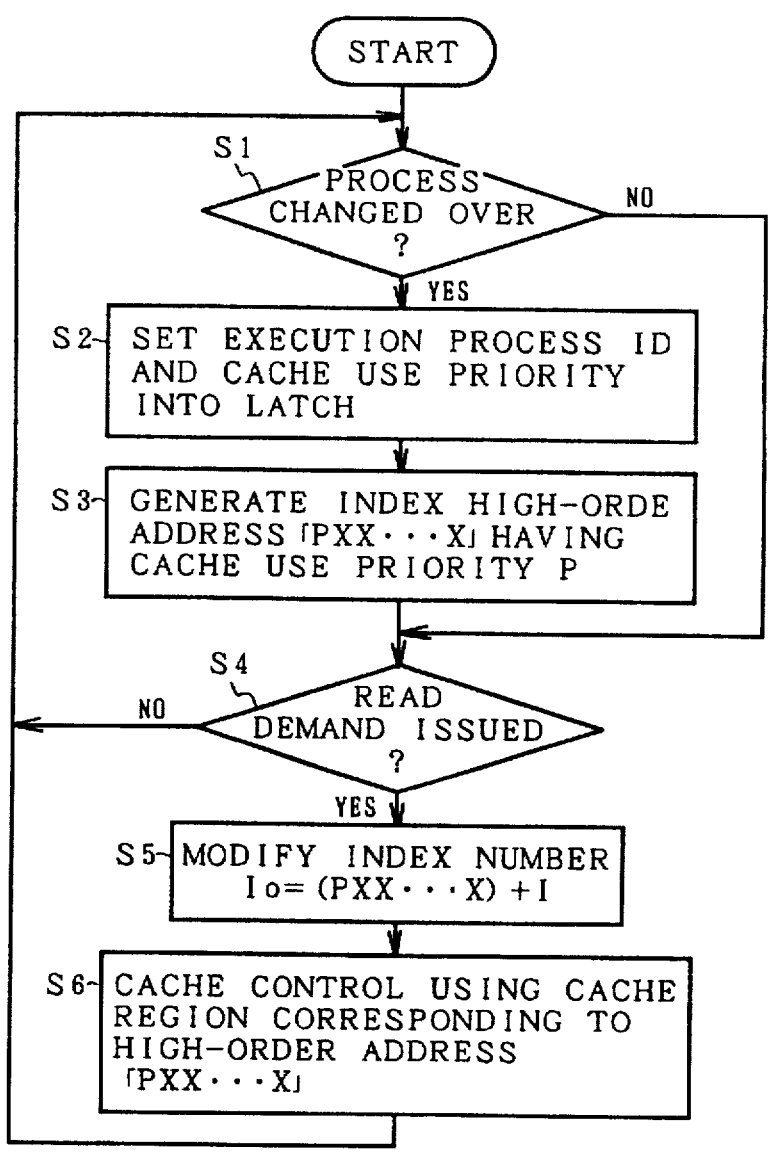
FIG. 13 is a flow chart showing the control processing of FIG. 11.

Referring to FIG. 11, there is shown a further embodiment of the present invention which is characterized in that the use region of the cache memory is divided for use on a priority basis in accordance with the cache use priority designated by a process. The block configuration of FIG. 11 is substantially the same as that of FIG. 9 except that the strategy controller 18 sends to the adjuster 48 the cache use priority P which has been written to the register 12-1 of the latch 12 at the time of a process changeover by the CPU 10. At the reception of a read demand from the CPU 10, the adjuster 48 modifies as a high-order address the value I of the index 36 within the access address written to the register 12-2 of the latch 12, by adding thereto the cache use priority P imparted from the strategy controller 18. In FIG. 4C for example, nine bits are used to define the value I of the index 36. Thus, the cache use priority P from the strategy controller 18 is added to this nine-bit index value I to obtain a high-order address of tenth bit or above. By virtue of such addition of the cache use priority P as a high-order address to the index value I in the adjuster 48, in the case for example of a user process ID=0 with the cache use priority P=2, the indexes or entries of the banks #0 and #1 of the cache memory 24 will fall within a region A due to the addition of an upper bit 0 corresponding to P=2. On the contrary, in the case of another user process ID=1 with the cache use priority P=1, they can fall within a different region B due to the addition of an upper bit 1 corresponding to P=1. In other words, by modifying into an upper bit configuration the index value I derived from the access address latched register 12-2 by means of the cache use priority P provided as output of the strategy controller 18, mutually exclusive index values can be obtained on a cache use priority basis, making it possible to vary the used cache region in accordance with the cache use priority.

According to the present invention as set forth hereinabove, it is possible to designate the cache use priority on a process-by-process basis and hence to allow for not only the conventional CPU allocation based processing time priority in the multiprocess execution but also the cache control priority, whereupon by designating proper cache use priority in accordance with the significance of a problem which the process is solving and with the nature of the memory use, the contents of the cache control are varied in response to the cache use priority, enabling a higher speed process execution to be implemented.

Although in the above embodiments the set associative cache employs a two-way set associative cache arrangement by way of example, the number of ways can be an arbitrary value. Although in the above embodiments the process ID is included within the access address tag area by way of example, it may be separately managed without being included within the tag area. It will also be appreciated that the present invention is not limited to specified numerical values as illustrated in the above embodiments.

What is claimed is:

1. A multiprocess execution system comprising:

a processing unit for executing a specified process from among a plurality of processes in accordance with a process priority based use allocation schedule;

a cache memory for temporarily storing main storage resources for use in said processing unit;

a cache use priority designation unit for designating an cache use priority pertaining to said cache memory when any one process is executed by said processing unit; and a cache control unit for controlling, in response to an access demand from said processing unit, an access to said cache memory in accordance with said cache use priority: wherein said cache control unit is provided with a set associative control feature in which said cache memory is divided into set regions each including frame blocks of a predetermined number of ways m, each frame block having a length corresponding to a predetermined block length of said main storage, said frame blocks constituting each set region each including a valid bit field, a tag field having a process ID, and a data field for storing one frame block of said main storage therein: and in which through an index-based designation of a set region performed in response to an access demand from said processing unit, one or a plurality of frame blocks within said set region is acquired, and if there exists a frame block whose tag field process ID coincides with the process ID included in said access demand and whose valid bit is set, judgment results in a hit to handle said access demand; and wherein said cache control unit varies in accordance with a cache use priority P designated the number of ways m of said set associative control available to a process, without varying the capacity of the cache memory within the same cache memory.

2. A system according to claim 1, wherein said cache use priority designation unit designates a cache use priority identical to said process priority.

3. A system according to claim 1, wherein said cache use priority designation unit designates a cache memory priority different from said process priority.

4. A system according to claim 3, wherein said cache use priority designation unit designates said cache use priority on the basis of the nature of main storage use by a process to be executed.

5. A system according to claim 4, wherein said cache use priority designation unit designates, when a process to be executed is a retrieval, a higher cache use priority than those of simultaneously scheduled other processes.

6. A system according to claim 3, wherein said cache use priority designation unit designates said cache use priority on the basis of statistical information on hit and mishit logged in said cache control unit.

7. A system according to claim 6, wherein said cache use priority designation unit designates, when there occur frequent mishits in said cache control unit, a higher cache use priority than those of simultaneously scheduled other processes, but designates when there occur rare mishits therein, a lower cache use priority than those of simultaneously scheduled other processes.

8. A system according to claim 1, wherein said cache control unit calculates, at the time of a process changeover, a modified number of ways n by multiplying the number of ways m of said set associative control by a ratio ($P/P_{max}$) of a designated cache use priority P to a designation possible maximum cache use priority $P_{max}$, and executes upon the reception of an access demand from said processing unit, set associative cache control in accordance with said modified number of ways n.

9. A system according to claim 8, wherein providing that a read demand results in a mishit, said cache control unit acquires from said cache memory a frame block whose tag includes the same process ID as that of said demand access, to count the number of the frame blocks M; and wherein providing that said count value M is less than said modified number of ways n, said cache control unit determines an object frame block from among all the frame blocks within a set, to replace its main storage data; and wherein providing that said count value M is equal to or greater than said modified number of ways n and there exists a frame block whose valid bit has not been set, said frame block is determined as an object whose main storage data are replaced; and wherein providing that said count value M is equal to or greater than said modified number of ways n and all the valid bits have been set, an object frame block is determined from among the frame blocks being used by said process, to replace its main storage data.

10. A multiprocess execution system comprising:

a processing unit for executing a specified process from among a plurality of processes in accordance with a process priority based use allocation schedule;

a cache memory for temporarily storing main storage resources for use in said processing unit;

a cache use priority designation unit for designating a cache use priority pertaining to said cache memory when any one process is executed by said processing unit; and a cache control unit for controlling, in response to an access demand from said processing unit, an access to said cache memory in accordance with said cache use priority; wherein said cache control unit is provided with a set associative control feature in which said cache memory is divided into set regions each including frame blocks of a predetermined number of ways m, each frame block having a length corresponding to a predetermined block length of said main storage, said frame blocks constituting each set region each including a valid bit field, a tag field having a process ID, and a data field for storing one frame block of said main storage therein; and in which through an index-based designation of a set region performed in response to an access demand from said processing unit, one or a plurality of frame blocks within said set region is acquired, and if there exists a frame block whose tag field process ID coincides with the process ID included in said access demand and whose valid bit is set, judgment results in a hit to handle said access demand; and wherein said cache control unit calculates, at a process changeover, a modified index number $I_n$ from the maximum value $I_m$ of the index number determined by the number of frame blocks constituting each set region, said cache use priority P, and a designation possible maximum cache use priority $P_{max}$, wherein said cache control unit executes, upon the reception of an access demand from said processing unit, set associative control inside a frame block region of each set region restricted by said modified index number $I_n$ and wherein said cache control unit varies, in accordance with said cache use priority P, the number of ways m of said set associative control available to a process, without varying the capacity of the cache memory within the same cache memory.

11. A system according to claim 10, wherein said cache control unit executes, upon the reception of an access demand from said processing unit, said set associative control by using as said modified index number the integral part $I_0$, of the value obtained by multiplying a demanded index I by a ratio $(I_n/I_m)$ of said modified index number $I_n$ to the maximum value $I_m$.

12. A system according to claim 10, wherein said cache use priority designation unit designates a cache use priority identical to said process priority.

13. A system according to claim 10, wherein said cache use priority designation unit designates a cache memory priority different from said process priority.

14. A system according to claim 13, wherein said cache use priority designation unit designates said cache use priority on the basis of the nature of main storage use by a process to be executed.

15. A system according to claim 14, wherein said cache use priority designation unit designates, when a process to be executed is a retrieval, a higher cache use priority than those of simultaneously scheduled other processes.

16. A system according to claim 13, wherein said cache use priority designation unit designates said cache use priority on the basis of statistical information on hit and mis-hit logged in said cache control unit.

17. A system according to claim 16, wherein said cache use priority designation unit designates, when there occur frequent mis-hits in said cache control unit, a higher cache use priority than those of simultaneously scheduled other processes, but designates when there occur rare mis-hits therein, a lower cache use priority than those of simultaneously scheduled other processes.

18. A multiprocess execution system comprising:

a processing unit for executing a specified process from among a plurality of processes in accordance with a process priority based use allocation schedule;

a cache memory for temporarily storing main storage resources for use in said processing unit;

a cache use priority designation unit for designating a cache use priority pertaining to said cache memory when any one process is executed by said processing unit; and a cache control unit for controlling, in response to an access demand from said processing unit, an access to said cache memory in accordance with said cache use priority; wherein said cache control unit is provided with a set associative control feature in which said cache memory is divided into set regions each including frame blocks of a predetermined number of ways m, each frame block having a length corresponding to a predetermined block length of said main storage, said frame blocks constituting each set region each including a valid bit field, a tag field having a process ID, and a data field for storing one frame block of said main storage therein; and in which through an index-based designation of a set region performed in response to an access demand from said processing unit, one or a plurality of frame blocks within said set region is acquired, and if there exists a frame block whose tag field process ID coincides with the process ID included in said access demand and whose valid bit is set, judgment results in a hit to handle said access demand; and wherein said cache control unit designates a cache use priority P at the time of a process changeover, and upon the reception of an access demand from said processing unit combines as a high-order address the value based on said cache use priority P designated at the process changeover with an index I of said access demand, and executes said set associative control for a specified set region defined by said high-order address and wherein said cache control unit varies, in accordance with said cache use priority P, the number of ways m of said set associative control available to a process, without varying the capacity of the cache memory within the same cache memory.

* * * * *